United States Patent

Van Konynenburg et al.

Patent Number: 5,980,718
Date of Patent: Nov. 9, 1999

[54] MEANS FOR LIMITING AND AMELIORATING ELECTRODE SHORTING

[75] Inventors: Richard A. Van Konynenburg, Livermore; Joseph C. Farmer, Tracy, both of Calif.

[73] Assignee: The Regents of the University of California, Oakland, Calif.

[21] Appl. No.: 09/072,296

[22] Filed: May 4, 1998

[51] Int. Cl.[6] .................................................. B01D 15/08
[52] U.S. Cl. .......................... 204/551; 204/647; 210/243
[58] Field of Search .................................... 204/551, 647; 210/243

[56] References Cited

U.S. PATENT DOCUMENTS 5,779,891   7/1998   Andelman .............................. 204/600

Primary Examiner—Arun S. Phasge
Attorney, Agent, or Firm—L. E. Carnahan

[57] ABSTRACT

A fuse and filter arrangement for limiting and ameliorating electrode shorting in capacitive deionization water purification systems utilizing carbon aerogel, for example. This arrangement limits and ameliorates the effects of conducting particles or debonded carbon aerogel in shorting the electrodes of a system such as a capacitive deionization water purification system. This is important because of the small interelectrode spacing and the finite possibility of debonding or fragmentation of carbon aerogel in a large system. The fuse and filter arrangement electrically protect the entire system from shutting down if a single pair of electrodes is shorted and mechanically prevents a conducting particle from migrating through the electrode stack, shorting a series of electrode pairs in sequence. It also limits the amount of energy released in a shorting event. The arrangement consists of a set of circuit breakers or fuses with one fuse or breaker in the power line connected to one electrode of each electrode pair and a set of screens of filters in the water flow channels between each set of electrode pairs.

19 Claims, 2 Drawing Sheets

MEANS FOR LIMITING AND AMELIORATING ELECTRODE SHORTING

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention is directed to electrode shorting, particularly to limiting and ameliorating electrode shorting in systems such as capacitive deionization water purification systems, which utilize a stack of electrode pairs, and more particularly to electrically protect an entire system from shutting down if a single pair of electrodes is shorted and to mechanically prevent a conducting particle from shorting a series of electrode pairs.

Various capacitive systems utilize a plurality or stack of electrode pairs. For example, one such system which utilizes stacks of electrode pairs is a capacitive deionization water purification system. An example of such a water purification system involving capacitive deionization utilizing carbon aerogel electrodes is described and claimed in U.S. Pat. No. 5,425,858 issued Jun. 20, 1995, to J. C. Farmer and is directed to a method for removing ionic solutes from water. The patented method makes use of pairs of carbon aerogel electrodes arranged with interelectrode gaps of small size (about 0.5 mm), through which the water is made to flow. Large stacks containing many electrode pairs are powered by a common power supply and are wired in parallel. Water flow passes through the gaps between the electrode pairs in series. In such a configuration of electrode pairs, if a single electrode pair becomes electrically shorted, such as by a conducting particle that spans the interelectrode gap, the entire stack could be shut down and considerable energy could be released. In addition, it would be possible for a single conducting particle to move through the stack, shorting a series of electrode pairs in sequence. One possible source of such conducting particles, and thus shorting of electrode pairs, would be due to debonding or fragmentation of the carbon aerogel electrodes. Thus there has been a need for means to prevent electrode pair shorting and to prevent migration of particles through the electrode pairs.

The present invention addresses both the shorting of a single electrode pair and the sequential shorting of a series of electrode pairs, either by carbon aerogel fragments or by any other particles or conducting solid materials.

SUMMARY OF THE INVENTION

It is an object of the present invention to limit and ameliorate electrode shorting in capacitive systems.

A further object is to provide means for electrically protecting a capacitive system due to shorting of an electrode pair in the system.

A further object is to prevent a conducting particle from shorting a series of electrode pairs.

Another object of the invention is to provide for limiting and ameliorating the effects of conductive particles, such as debonded or fragmented carbon aerogel, in shorting the electrodes of a capacitive deionization water purification system.

Another object of the invention is to prevent an entire system from shutting down due to a single pair of electrodes being shorted.

Another object of the invention is to mechanically prevent a conducting particle from migrating through an electrode stack causing shorting of a series of electrode pairs in sequence.

Another object of the invention is to limit the amount of energy released in a shorting event within a capacitive system.

Another object of the invention is to reduce or eliminate the effects of shorting in a capacitive deionization water purification system using electrode pairs composited of carbon aerogel.

Another object of the invention is to provide a capacitive system with circuit breakers or fuses connected to an electrode of each electrode pair and screens or filters in the water flow channels between each set of electrode pairs to limit and ameliorate electrode shorting therein.

Other objects and advantages of the invention will become apparent from the following description and accompanying drawings. The present invention limits and ameliorates the effects of conducting particles in shorting the electrodes of capacitive systems. This invention is particularly applicable to capacitive deionization water purification systems, such as those using carbon aerogel electrodes, wherein the conducting particles may be composed of debonded or fragmented carbon aerogel. However, the invention can be utilized in any capacitive system utilizing electrode pairs. The invention provides a system using a stack of electrode pairs with means (circuit breakers or fuses) to electrically protect the entire system from shutting down if a single pair of electrodes is shorted and provides means (screens or filters) to mechanically prevent a conducting particle from migrating through the electrode stack causing shorting of a series of electrode pairs in sequence. By limiting and ameliorating electrode shorting in capacitive systems, the invention limits the amount of energy released in a shorting event.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention limits and ameliorates electrode shorting in capacitive systems. The invention is particularly applicable to limit and ameliorate the effects of conducting particles in shorting the electrodes of a capacitive deionization water purification system or other capacitive system having small interelectrode spacing. Capacitive systems using carbon aerogel electrodes have the potential for electrode pair shorting due to conductive particles, such as debonded or fragmented carbon aerogel. The invention electrically protects the entire system from shutting down if a single pair of electrodes is shorted and mechanically prevents a conducting particle from migrating through the electrode stack, shorting a series of electrode pairs in sequence. Thus the invention also functions to limit the amount of energy released in a shorting event. Thus this invention addresses both the shorting of a single electrode pair and sequential shorting of a series of electrode pairs by conductive solid material, such as debonded or fragmented carbon aerogel utilized in capacitive systems, such as deionization water purification systems.

The invention consists of two parts: the first part is a set of circuit breakers or fuses with one breaker or fuse connected in the power line connected to one electrode of each electrode pair; the second being a set of screens or filters located in the water flow channels between each set of electrode pairs.

The first part of the invention (circuit breakers or fuses) will cause power to be removed from only the shorted pair of electrodes, allowing the remainder of the stack to continue operation at almost full efficiency until the short can be eliminated during the regeneration phase of the operating cycle. The location of the short will be indicated by the blown fuse or circuit breaker. The current capacity of the fuse or circuit breaker will be set above the normal charging and discharging current but below the capacity of the power supply. It will thus remain closed during normal operation, opening up only in the event of a short circuit, and thus limiting the amount of energy released as heat thus protecting the stack and allowing it to continue in operation. An embodiment of a capacitive stack of electrode pairs incorporating fuses for each electrode pair is illustrated in FIG. 1 and described in detail hereinafter.

The second part of the invention will prevent particles (conductive or nonconductive) from moving through the electrode pairs in the stack thus isolating any possible shorts. An embodiment of an electrode pair of a capacitive stack, such as illustrated in FIG. 1, incorporating screens or filters is illustrated in FIG. 2 and described in detail hereinafter.

Figure 1:
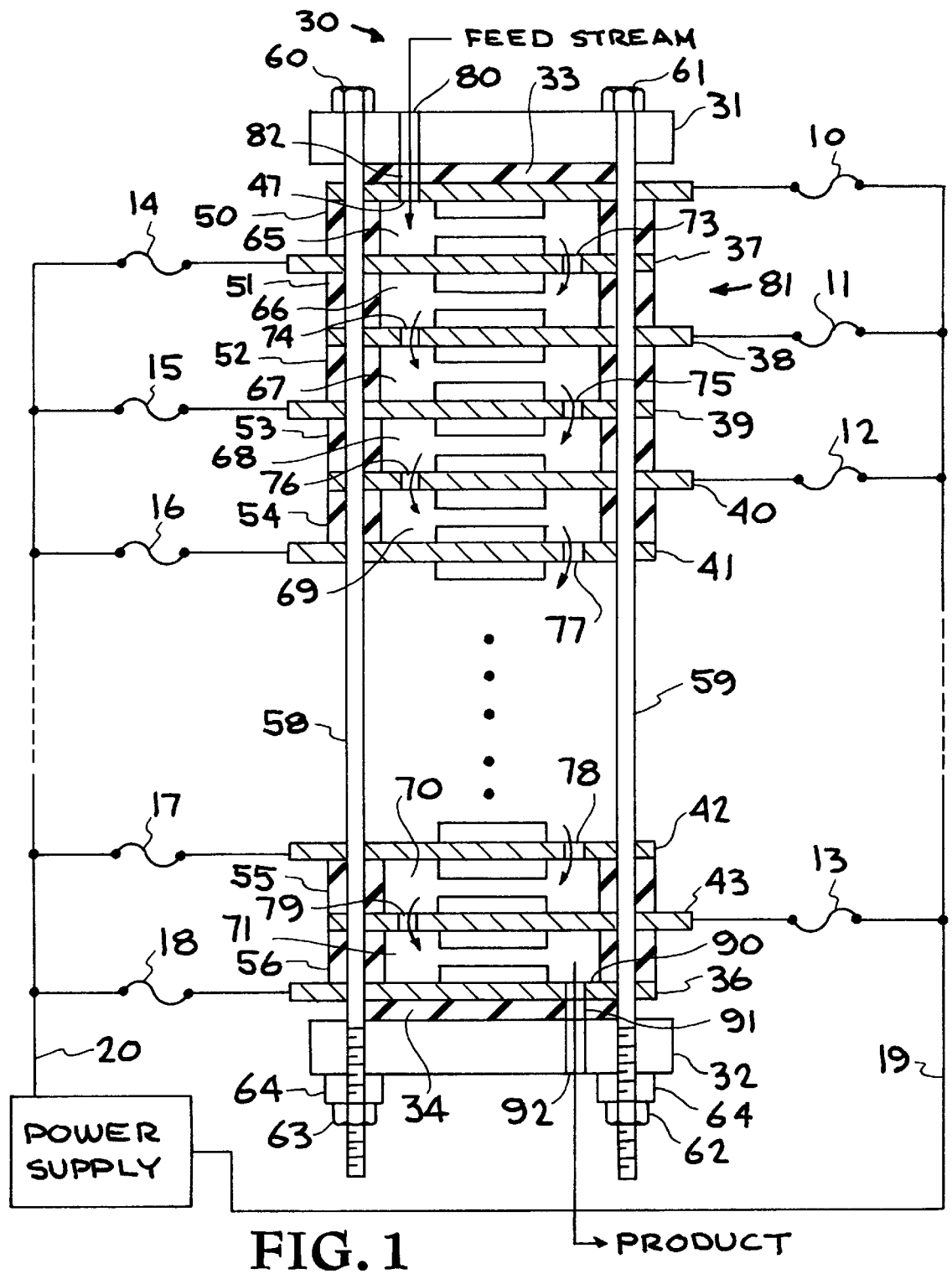
FIG. 1 schematically illustrates in cross-section an electrochemical cell, such as used in a capacitive deionization water purification system, with the electrical shorting protecting arrangement of the present invention.

Referring now to the drawings, FIG. 1 is a schematic, sectional, elevational view of an electrochemical cell which incorporates the fuse or circuit breaker arrangement in accordance with the present invention. The electrochemical cells, generally indicated at 30, include two oppositely disposed, spaced-apart end plates 31 and 32, one at each end of the cell 30; and two generally identical single-sided end electrodes 35 and 36, one at each end of the cell 30, adjacent to the end plates 31 and 32, respectively. An insulator layer 33 is interposed between the end plate 31 and the end electrode 35. Similarly, an insulator layer 34 is interposed between the end plate 32 and the end electrode 36. Each single-sided electrode 35 and 36 includes a single sheet of carbon aerogel composite bonded to one side of a titanium sheet, for example, with a conductive epoxy or other appropriate bonding material.

A plurality of generally identical, double-sided intermediate electrodes 37 to 43 are spaced apart and equidistantly separated from each other between the two end electrodes 35 and 36. Each double-sided electrode 37–43 includes two sheets of carbon aerogel composite bonded to both sides of a titanium sheet with a conductive epoxy, for example. While FIG. 3 illustrates only seven double-sided intermediate electrodes 37–43, any number of such electrodes may be utilized. For instance, it would be possible to expand the capacity of cell 30 to accommodate at least 192 intermediate electrodes, such that the total anode, or cathode, surface area is approximately $2.7 \times 10^8$ cm$^2$. Ultimately, the cell could be expanded to include an unlimited number of electrode pairs. The end electrodes 35 and 36 and the intermediate electrodes 37–43 are generally similar in construction and composition, except that intermediate electrodes 37–43 have two sheets of carbon aerogel composite bonded to both sides of the titanium sheet. While a carbon aerogel composite is preferred, other porous conductive, monolithic materials can be used. The electrodes 35, 36, and 37–43 may be constructed, for example, as described in above-referenced U.S. Pat. No. 5,425,858, with an electrode 37 being illustrated in FIG. 2.

Figure 2:
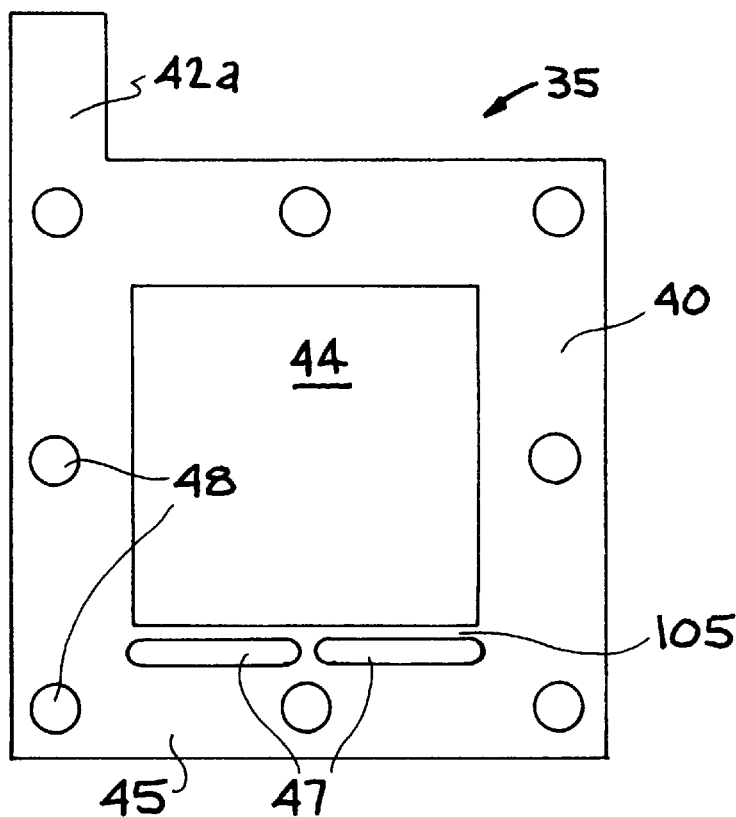
FIG. 2 is a greatly enlarged top view of a single-sided capacitive electrode of the FIG. 1 cell.
Figure 3:
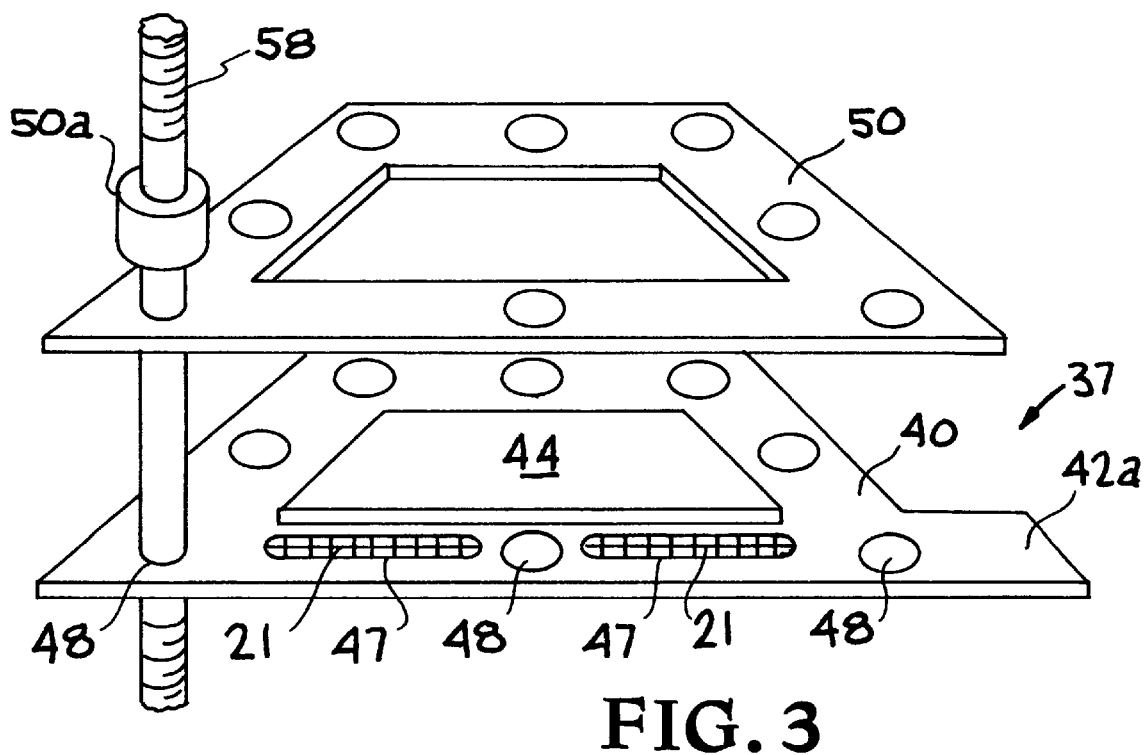
FIG. 3 is a greatly enlarged exploded view of a double-sided capacitive electrode of the FIG. 1 cell.

FIG. 2 is a plan or top view of a single-sided end electrode 35, which includes a generally flat, thin rectangular shaped, corrosion resistant, metallic (e.g, titanium) sheet, structural support 40. A tab 42 extends from one side of the structural support 40, for connection to the appropriate pole of a D.C. power supply, not shown. A thin sheet 44 of high specific area, porous, conductive, monolithic material (e.g., carbon aerogel composite) is bonded to the surface of the structural support 40, and is suitable to be either a cathode or an anode. In this particular example, it will be presumed that the end electrode 35 is an anode. The structural support 40 further includes a series of generally identical apertures 47 for providing a passage to the electrolyte, through the end electrode 35.

The end electrodes 35 and 36 and the adjacent intermediate electrodes 37–43 are separated by means of thin sheets of insulating material, such as rubber gaskets 50–56. Each gasket has a large, square aperture in the center to accommodate adjacent carbon aerogel composite electrodes 44. As shown in FIG. 2 and 3, the structural support 40 includes a plurality of peripheral holes 48, such that when the cell 30 is to be assembled, the peripheral holes 48 are coaligned with corresponding peripheral holes in the insulation layers 33 and 34 and the rubber gaskets 50–56; and a plurality of threaded rods 58 and 59 are inserted through these coaligned holes and are tightened by conventional means, such as nuts 60–63 (see FIG. 1). Noncompressible, insulating, hollow, cylindrical spacers or compression rings 50A can be inserted in the peripheral holes of the rubber gaskets 50–56 and used to control the spacing of adjacent electrodes. A plurality of compressive sleeves 64A and 64B can be added to provide additional force for sealing.

While only two threaded rods 58 and 59 are shown in this embodiment, eight threaded rods are utilized to tighten the cell 30 to a leakproof state, the eight rods extending through the eight peripheral holes 48 in the structural support 40, as well as through corresponding peripheral holes in the rubber gaskets 50–56 filled with hollow-cylindrical spacers 50A.

Once the cell 30 is assembled, a plurality of chambers 65–71 are formed between the end on intermediate electrodes 35–43. The chambers 65–71 are adapted to fluidly communicate with each other via a plurality of apertures 73–79 in the structural supports of the intermediate electrodes 37–43, respectively. The apertures 73–79 are not coaligned and may be either holes or slits. They are so positioned that the fluid path therethrough, within chambers 65–71, is forced to flow across all the exposed surfaces of the carbon aerogel composite electrodes 44. As shown in FIG. 1, the fluid first flows from left-to-right, then from right-to-left, and so on as shown by the arrows.

In operation, and for illustration purposes, the anodes and cathodes of the cell 30 are interleaved in an alternating arrangement. In this respect, every other electrode is an anode, starting with the end electrode 35 and ending with the intermediate electrode 43; and the remaining intermediate electrodes 37, 39, 41, 42, and end electrode 36 are cathodes. As such, each pair of adjacent electrodes (anode and cathode) forms a separate capacitive deionization/ regeneration unit 81, when the cell 30 is utilized in a water purification system, for example.

The stream of raw fluid or electrolyte to be processed enters the cell through a plurality of superposed, coaxially registered, generally circularly or rectangularly shaped openings, including an aperture 80 in the end plate 31, one or more apertures 82 in the insulation layer 33 and the apertures 47 in the end electrode 35. The fluid flows through the first chamber 65, as indicated by the arrow A, substantially parallel to the electrode surface. The fluid stream then flows through the aperture 73 into the next chamber as indicated by arrow B, and the fluid continues to travel through the chambers as indicated by the arrows C–G. As pointed out above, each chamber and adjacent pair of electrodes form a capacitive deionization/regeneration unit 81, and thus the fluid passing through the chambers is progressively purified. Thereafter, as indicated by the arrow H, the purified fluid stream exits the cell 30 via a plurality of coaxially aligned apertures 90, 91, and 92 in end electrode 36, insulator layer 34, and back plate 32, respectively.

As pointed out above, the electrode pairs of the cell 30 may be shorted by a particle of conductive material passing through the flow paths of the system. To prevent adverse effects of such shorting or short circuiting within the cell 30, the invention provides a fuse or circuit breaker arrangement for each of the electrode pairs. The fuse or circuit breakers can be used on either the positive or the negative plates of each capacitor (electrode pair) or can be used on both for added protection. As shown in FIG. 1, fuses or circuit breakers 10, 11, 12, and 13 are electrically connected to electrodes 35, 38, 40, and 43, respectively; and fuses or circuit breakers 14, 15, 16, 17, and 18 are, respectively, connected to electrodes 37, 39, 41, 42, and 36. The fuses or circuit breakers 10–13 are connected to a negative terminal of a power supply as indicated by legend and arrow 19, and the fuses or circuit breakers 14–18 are connected to a positive terminal of a power supply as indicated by legend and arrow 20.

The fuses or circuit breakers 10–13 and 14–18 will cause power to be removed from only the shorted pair of electrodes (35–37, 37–38, 38–39, etc.), allowing the remainder of the stack (cell 30) to continue operation at almost full efficiency until the short can be eliminated during the regeneration phase of the operating cycle of a capacitive deionization water purification system, for example. The location of the short is readily indicated by the blown fuse or circuit breaker 10–18. The current capacity of each fuse or circuit breaker is set above the normal charging and discharging current but below the capacity of the power supply. Each fuse or breaker will thus remain closed during normal operation, opening only in the event of a short circuit and limiting the amount of energy released as heat, thus protecting the stack (cell 30) and allowing it to continue in operation.

To prevent passage of conductive particles through the cell 30, thus preventing short circuiting of sequential electrode pairs, screens or filters have been positioned in each of the electrode pairs. As shown in FIGS. 2 and 3 and described above, the structural supports 40 of each electrode includes apertures 47 for passage of the electrolyte through the cell 30. FIG. 3 illustrates screens or filters 21 in each of the apertures 47, thereby preventing passage of conductive particles from one electrode pair to the subsequent electrode pair, thereby preventing shorting of the subsequent electrode pairs. While FIG. 3 illustrates an intermediate electrode 37, the filters or screens 21 may also be added to the apertures 47 of end electrode 35. However, since a conductive particle is more likely to be produced by debonding or fragmentation of the carbon aerogel composite 44 of each electrode, the fluid passageways or apertures 47 of end electrodes 35 and 36 need not be provided with a screen or filter 21.

By way of example, the screen or filter 21 may be constructed of metals, such as titanium, or polymeric material having an opening size of 0.1 mm to 0.2 mm to trap particles of a size over about 0.1 mm to 0.2 mm, such that any conductive particle is of a size less than the interelectrode gaps, which may be about 0.5 mm.

It has thus been shown that the present invention limits and ameliorates the effects of conducting particles, such as debonded or fragmented carbon aerogel, in shorting the electrodes of a capacitive system. The invention provides a fuse or circuit breaker for each electrode pair in an electrode stack for protecting the entire system from shutting down if a single pair of electrodes is shorted. Also, the invention prevents migration of a conductive particle through the electrode stack by a screen or filter in the flow path through each electrode pair, thus preventing shorting of a series of electrode pairs in sequence. The invention also limits the amount of energy released in a shorting event.

While a particular embodiment of an electrode stack incorporating the invention has been illustrated, and various materials, parameters, etc., have been described to exemplify and explain the principles of the invention, such are not intended to be limiting. Modifications and changes may become apparent to those skilled in the art, and it is intended that the invention be limited only by the scope of the appended claims.

The invention claimed is:

1. A method for limiting and ameliorating electrode shorting in a capacitive system, having at least one pair of electrodes, comprising:

providing each pair of electrodes with electrical means which protect the entire capacitive system from shutting down if a single pair of electrodes is shorted.

2. The method of claim 1, additionally including mechanical means for preventing shorting of a series of electrode pairs in sequence.

3. The method of claim 2, wherein the mechanical means is selected from the group consisting of filters and screens.

4. The method of claim 2, wherein the mechanical means is positioned such that fluid passing through the pair of electrodes first passes through the mechanical means.

5. The method of claim 1, wherein the electrical means is selected from the group consisting of fuses and circuit breakers.

6. The method of claim 1, wherein the electrical means is connected intermediate one of the pair of electrodes and a power supply and connected intermediate another electrode of the pair of electrodes and the power supply.

7. In an apparatus comprising a plurality of electrode pairs constructed to enable fluid to pass between electrodes of each of said electrode pairs, the improvement comprising:

means for protecting shorting of at least one of said electrode pairs.

8. The improvement of claim 7, wherein said means for protecting is selected from the group consisting of fuses and circuit breakers.

9. The improvement of claim 7, wherein said means is connected intermediate each electrode of each of said electrode pairs and an associated power supply.

10. The improvement of claim 7, additionally including means for preventing conductive particles from migrating from one electrode pair to a subsequent electrode pair.

11. The improvement of claim 10, said means for preventing is selected from the group consisting of screens and filters located such that fluid passing through each electrode pair first passes through said means for preventing.

12. In a capacitive deionization water purification system, the improvement comprising:

means for limiting and ameliorating electrode shorting in the system.

13. The improvement of claim 12, including electrical means operatively connected to each electrode of said system, and mechanical means positioned in a fluid flow path through each adjacent pair of electrodes in said system.

14. The improvement of claim 13, wherein said electrical means is selected from the group consisting of fuses and circuit breakers.

15. The improvement of claim 13, wherein said mechanical means is selected from the group consisting of screens and filters.

16. The improvement of claim 15, wherein said mechanical means is located in a fluid flow path and located upstream of each adjacent pair of electrodes of said system.

17. The improvement of claim 13, wherein said electrical means is connected to each electrode of each adjacent electrode pair of said system.

18. The capacitive deionization water purification system of claim 12, including a stack of electrode pairs constructed to allow passage of fluid to be purified between the electrodes of each adjacent electrode pair and wherein said improvement comprises a fuse or circuit breaker electrically connected to each electrode of each electrode pair.

19. The capacitive deionization water purification system of claim 18, wherein each of said electrode pairs includes an opening through which fluid to be purified passes intermediate electrodes of each electrode pair, and wherein said improvement comprises a screen or filter mounted in said opening of each of said electrode pairs.

* * * * *